INVENTORS:
Neil Everett Powell & Everett McCown
BY Everett N. Curtis
Atty

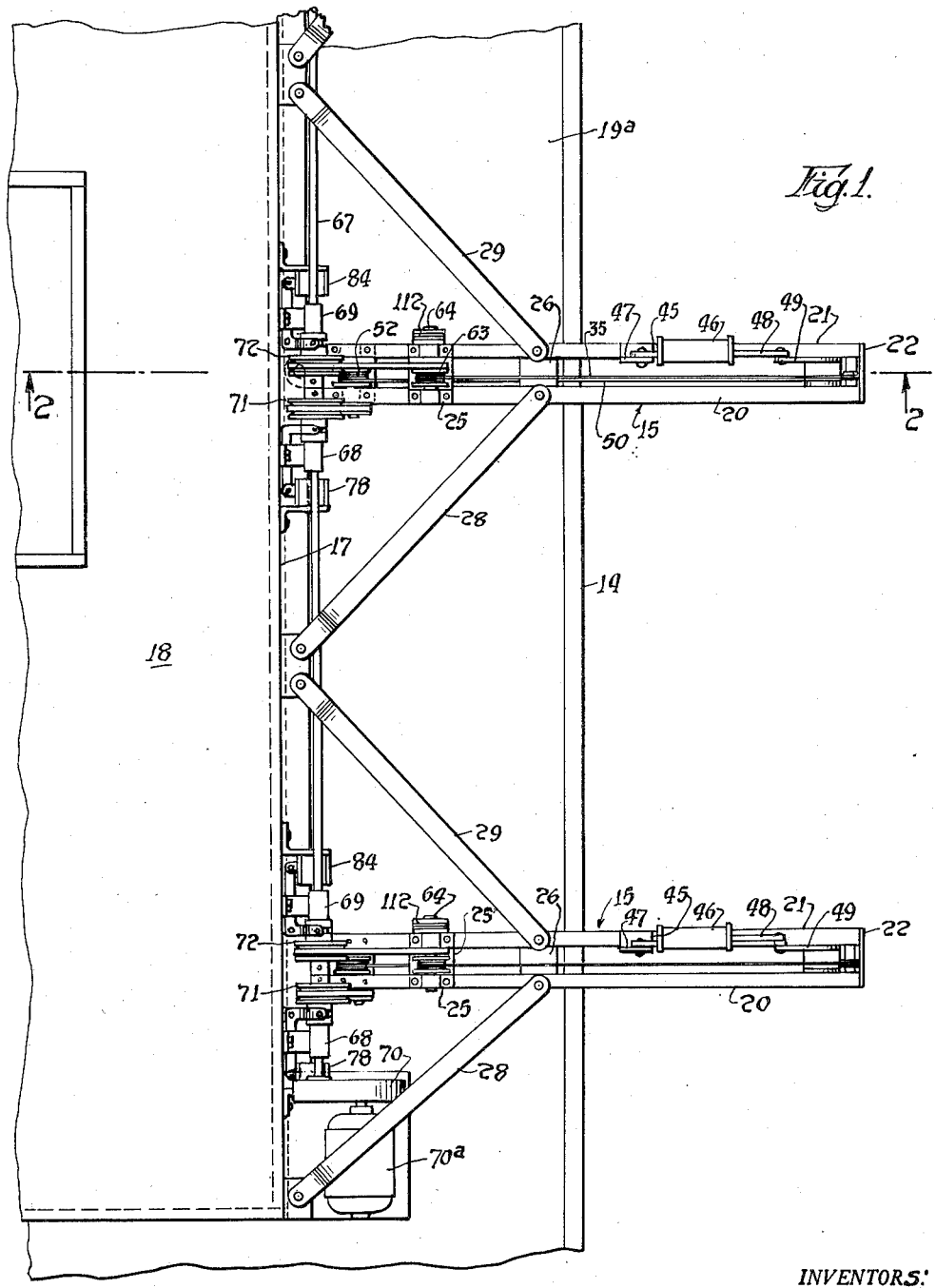

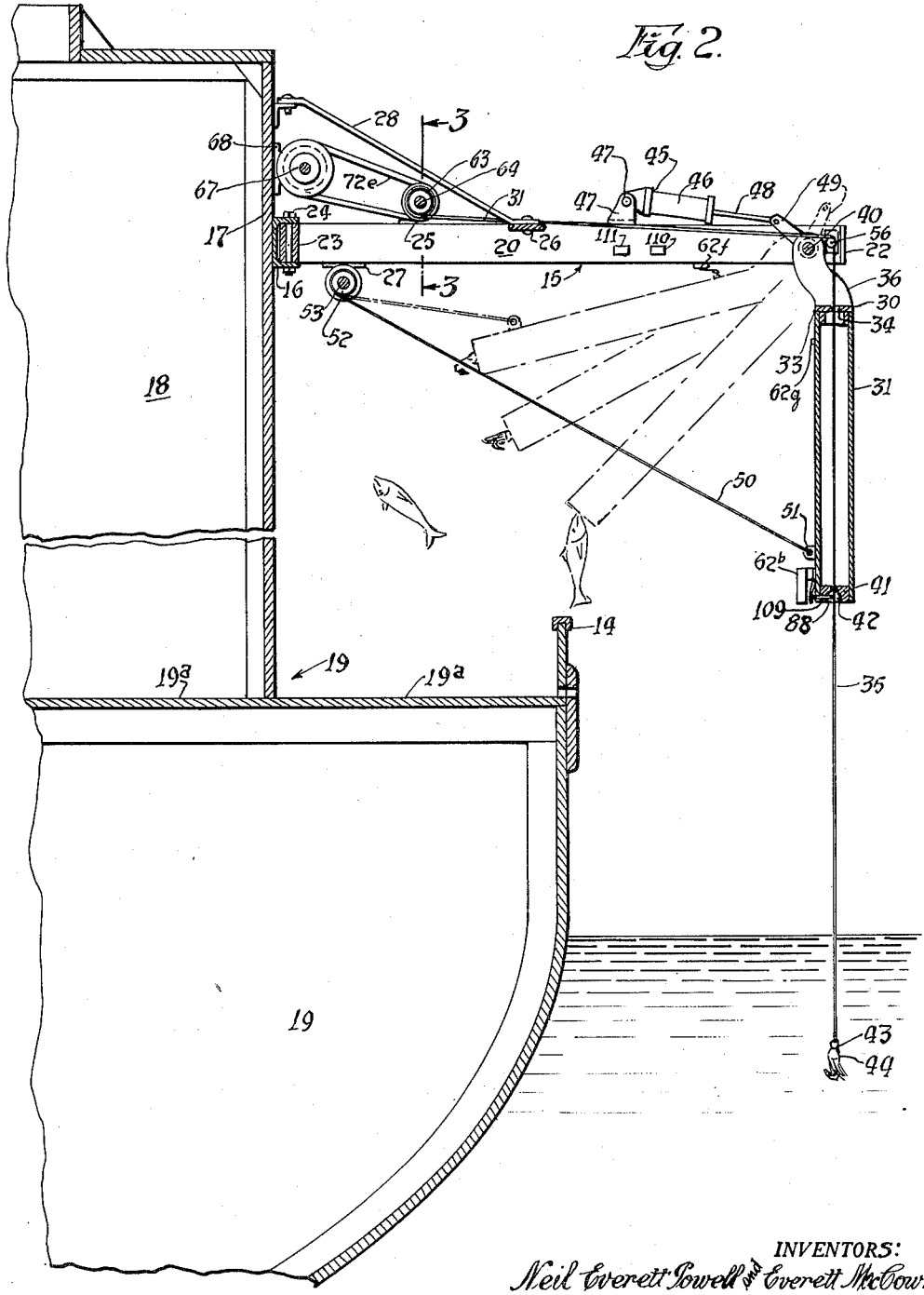

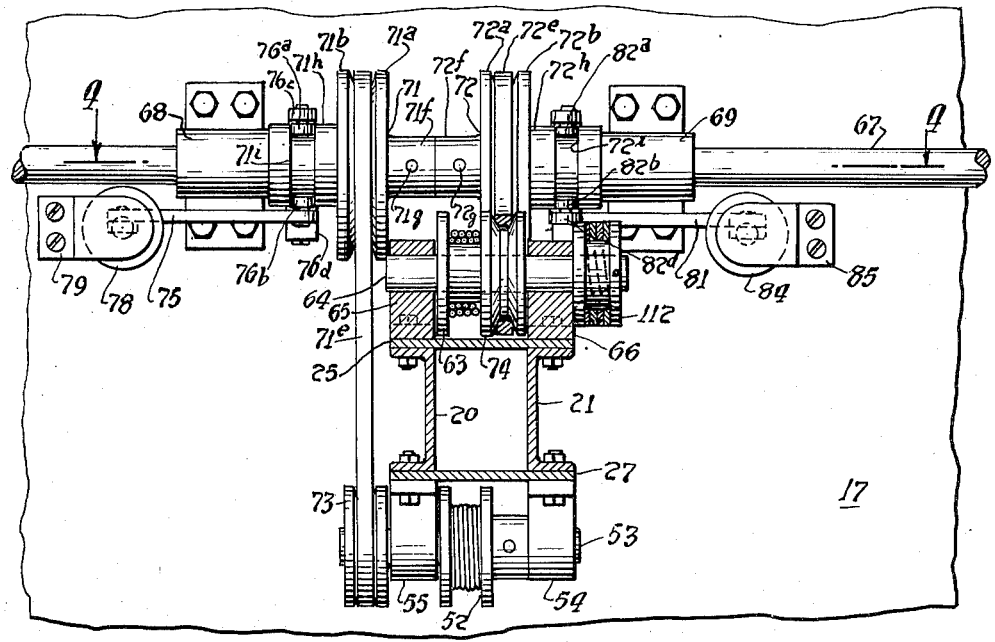

Witness:
Enea A. Camporini

Sept. 26, 1950     N. E. POWELL ET AL     2,523,592
AUTOMATIC FISHING APPARATUS
Filed Nov. 27, 1946     5 Sheets-Sheet 5
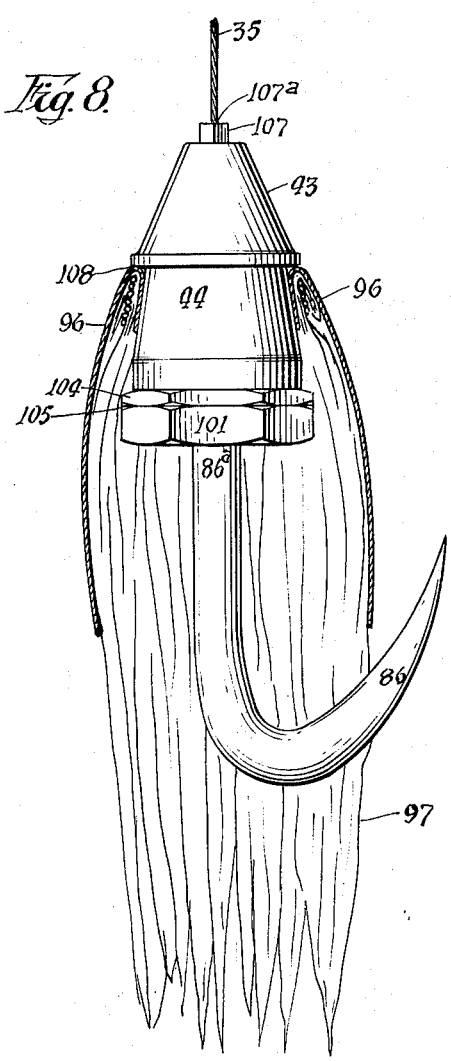
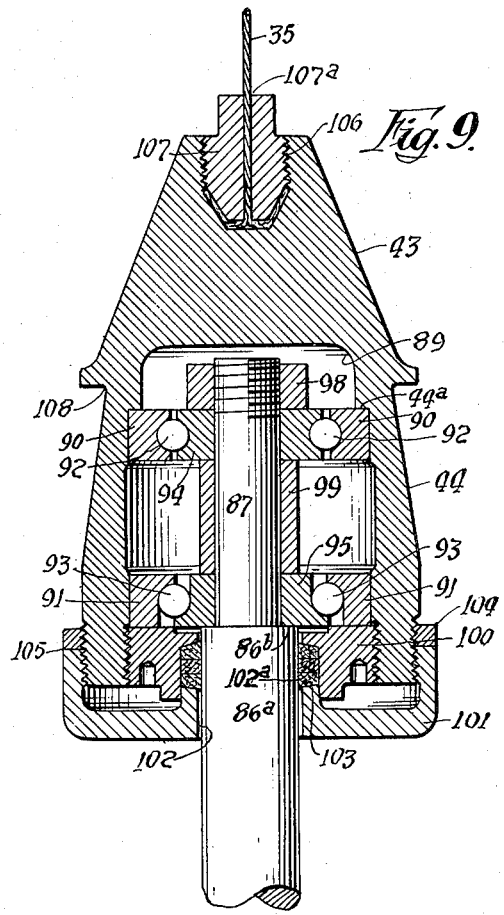
INVENTORS:
Neil Everett Powell and Everett McCown
BY Everett N. Curtis
Atty.
Witness:
Enea A. Campourn Patented Sept. 26, 1950

2,523,592

UNITED STATES PATENT OFFICE 2,523,592

AUTOMATIC FISHING APPARATUS

Neil Everett Powell and Everett McCown,
San Diego, Calif.

Application November 27, 1946, Serial No. 712,694

4 Claims. (Cl. 43—15)

Our invention relates to automatic fishing apparatus, particularly to fishing pole devices designed to be attached to, and outwardly to extend from, the sides of fishing craft, and automatically actuated for catching, reeling and hauling aboard tuna of other species of large sized fish running in schools in the ocean; and its objects are to dispense with the expense and necessity of using the conventional line and pole for catching the fish, and thereby to obviate any question of human endurance or the occurrence of injuries resulting from this method of fishing; to reduce the time heretofore required for catching this species of fish and diminish the time required for the usual trip; to bring about the automatic handling of the catching of any fish up to the weight limits of the hook and line used for the purpose; to provide electromechanical means cooperating with a rod and swingle for automatically hooking a fish when struck and actuated thereby; to permit ready stowage of the fish while the run is on without requiring the cessation of fishing heretofore required of fishermen for such purpose at any time before the termination of said run; to render the parts readily accessible for inspection, adjustment, replacement and repair, and generally to provide a fishing device which is simple and economical of construction, efficient in action and of prolonged life and durability. These and other objects will appear from the drawing and as hereinafter described and set forth.

In accordance with the usual hand method now commonly used by fishermen upon tuna boats for runs of tuna, the average weight of each fish of which is under approximately forty pounds, one man working alone and putting forth his best efforts can land around twelve fish in the space of a minute. Where, however, the fish of the run are each of the average weight of approximately from forty to sixty-five pounds, two men per hook are required to land each fish; and where such average weight exceeds sixty-five pounds, three men per hook are assigned to the work. Since the work of catching a run of tuna is fatiguing and exhausting, and difficult to sustain over any length of time, there is always the limit of human endurance to be considered and taken into account. Also the matter of stowage is important in this connection, for under the present hand methods when the deck space available for the purpose is filled with the fish, several of the fishermen are compelled to cease fishing for the time being in order to clear such space and to stow the fish; a procedure which consumes valuable time taken away from the fishing while the run is on, so that it is not unusual for the run to end before such stowage is accomplished, and the possible maximum amount of the catch brought on board. Through the use of our improved automatic apparatus, however, all of these disadvantages are avoided, and the time required to catch the load limit of the tuna boat within the period of the run substantially reduced; the labor of the men on board being released to stow the catch without interruption as fast as the fish are caught; and the problem of fatigue and endurance of the fishermen being eliminated. Furthermore, the reduction of the time required for the trip being reduced by this improved method of fishing, such reduction is beneficial to all those taking part in the tuna fishing industry, as operating expenses are diminished while earnings are increased.

Our invention primarily consists in automatic fish catching mechanism secured to the side of a fishing boat, and actuated by electro-mechanical means connected therewith. Also our invention consists in providing, singly or in multiple, a pole or boom affixed to and outwardly extending from the side of a vessel, the said pole having downwardly depending from the outer end thereof, and pivotally connected thereto an inwardly moving swingle, both said pole and swingle having continuous intercommunicating passageways therethrough for the running of the fish line and having automatic means tripped by the strike of the fish bitting the hook for catching said fish and for reeling in the said line; and automatic means cooperating with said tripping means being provided for swinging said swingle back over the deck of the said vessel and releasing and dropping the caught fish thereon.

Our invention further consists in the improvements, novel features of construction, combination and arrangement of parts illustrated in the drawing and more particularly hereinafter described and claimed.

Attention is hereby directed to the drawing, illustrating a preferred form of our invention, in which similar numerals of designation refer to similar parts throughout the several views, and in which:

Figure 1 is a plan view of one form of our improved automatic fishing apparatus, showing the same applied in duplicate to the side of a fishing vessel;

Fig. 2 is a vertical section on line 2—2 of Fig. 1, looking in the direction of the arrows, and showing the automatic operation through connecting mechanism of one of the fishing poles and swingle pivotally mounted upon the end thereof;

Fig. 3 is an enlarged end elevation, partly in section on line 3—3 of Fig. 2, looking in the direction of the arrows, and illustrating the automatically operated electric - mechanical mechanism and connections thereof;

Fig. 4 is a plan view, partly in section on line 4—4 of Fig. 3, looking in the direction of the arrows, and showing the same mechanism illustrated in Fig. 3;

Fig. 8 is a greatly enlarged view of the fishhook and shank housing used in our apparatus, and Fig. 9 is a vertical section of the fishhook and housing shown in Fig. 8, and interior construction thereof.

Figure 6:
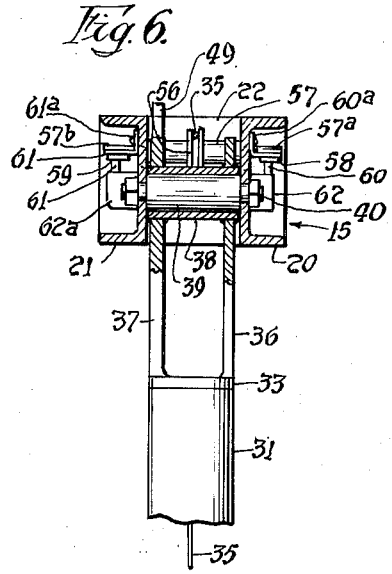
Fig. 6 is as vertical section on line 6—6 of Fig. 5, looking in the direction of the arrows.
Figure 5:
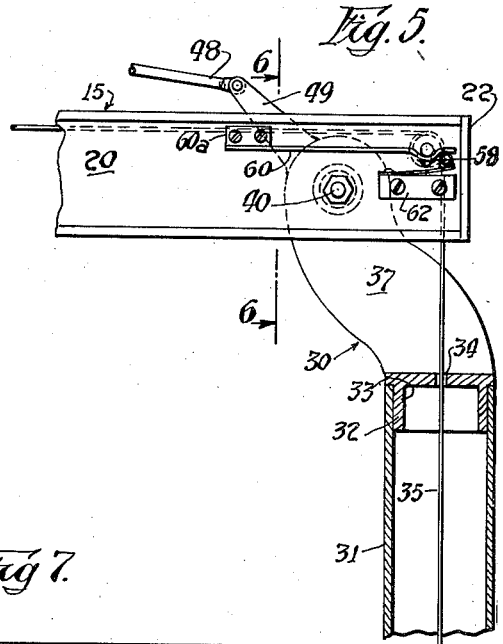
Fig. 5 is an enlarged vertical detailed section of a portion of the pivotally connected ends of the fishing pole and swingle, and adjacent parts.

Referring to the drawing, the horizontally extending fishing pole or boom 15 has its inner end hinged to the channeled bracket 16, mounted upon the side wall 17 of the live bait tank 18 secured to the deck 19a of the fishing boat 19; the outer end of said pole or boom being disposed so as to permit it to be swung outwardly of said boat for a substantial distance beyond the guardrail or gunwale 14 thereof. As shown, the pole 15 is preferably formed of two channel beams 20 and 21, located face to face in parallel spaced relation one to the other, connected at their outer ends by the plate 22, and at their inner ends by the cross-piece 23, pivotally connected by the bolt 24 to the top and bottom ledges of the bracket 16. Also connecting the beams 20 and 21, and maintaining the spaced relation thereof, are the top plates 25, 26, and the bottom plate 27. When the pole 15 is swung outwardly into its advanced normal fishing position, at approximately right angles to the side of the boat 19, as hereinafter described, it is preferably held against lateral or vertical displacement by the angularly disposed braces 28 and 29, detachably secured to the top plate 26 and to brackets affixed to the wall 17 of the tank 18.

Hinged to the outer end of the pole 15 and downwardly depending therefrom is the swingle 30, whose body is in the form of an elongated rectangular tube 31, to the top of which is welded or otherwise firmly secured through its shank 32 the cap member 33, having the opening 34 therethrough, forming a free passageway for the fishline 35 into the hollow of said tube 31, and said cap member having integral therewith in parallel spaced relation the flat upwardly extending wings 36 and 37; the tops of which wings have secured thereto the sleeve 38, turnably mounted upon the barrel 39, extending between and firmly secured to the outer ends of the beams 20 and 21 by the bolt 40. Inserted within the hollow of the bottom portion of the tube 31, and welded or otherwise firmly secured thereto is the plug 41, having the conical central aperture 42 allowing free passage therethrough of said fishline 35, and being shaped to permit abutting contact and registering engagement therewith of the truncated conical top 43 of the swivel hook housing 44.

For the purpose of allowing the swingle 30, when swung out of normal fishing upright position, to move back retardedly against yielding pressure restoring it to such position, we employ the conventional shock absorber 45; the cylinder head 46 of which is pivotally connected with the bracket 47, secured to the top of the beam 21 near the outer end thereof, and the plunger 48 which is pivotally connected with the finger 49 welded to the top of the wing 37. And for the purpose of causing the swingle to swing inwardly against said shock absorber and out of its said normal upright position, we employ the cable 50, the free end of which is fastened to the eye 51 welded to the lower end of the tube 31, and the remainder of which is wound upon the reel 52, mounted upon the countershaft 53, journalled in bearings 54, 55, secured to the underside of the bottom plate 27 and operated as hereinafter described. As will be observed from the drawing, the arrangement of these parts is such that all movement of the swingle is confined to an oscillation of about ninety degrees or a swing from its normal upright position inwardly toward and over the guardrail 14 of the boat 19 and back again to such normal location; the path of such movement at all times being directly beneath the pole 15 and without lateral deviation therefrom.

For the purpose of reeling in and out the fishline 35 as occasion requires, the said line after being threaded through the aperture 42 of plug 41, the hollow of the tube 31, and opening 34 in cap member 33, is made to pass upwardly over the pulley 56 carried upon the central portion of the floating roller 57, the ends of which are reduced in size to form trunnions 57a and 57b engaging with and passing through vertical slots shaped to receive the same in the adjacent walls of the beams 20 and 21, and which trunnions are sufficiently extended to be cradled in depressed recesses 58, 59 formed in the free ends of the horizontally extending resilient rods 60 and 61 secured to brackets 60a and 61a attached to said beams respectively; said recesses being so positioned in respect to said slots that a limited depressed movement of said roller against the yielding resilient support of said rods is permitted in order to allow engagement of the ends thereof with the arms of adjacent micro-switches 62 and 62a and to close or open the same in the manner and for the purposes hereinafter set forth. From the pulley 56 of the roller 57, the remainder of the fishline 35 passes inwardly and is wound upon the reel 63 mounted upon the countershaft 64, which is journalled in bearings 65, 66, secured to the top plate 25 and operated as hereinafter described.

For the purpose of supplying the power for turning the countershafts 53 and 64, we employ the horizontally disposed driving shaft 67 journalled in bearings 68 and 69 secured to the side wall 17 of the tank 18, and operatively connected to the usual train of gears in the gear box 70 of the conventional motor 70a, secured in any suitable manner to the said wall 17. Mounted upon said shaft between said bearings are the two V-belt pulleys 71 and 72, pulley 71 being divided into the separable halves 71a and 71b, and pulley 72 being divided into the separable halves 72a and 72b; and the central portions of the adjacent walls of each set of halves being hollowed out so as together to form circular chambers 71c and 72c, shaped respectively to receive with free play therein idler racers 71d and 72d each in the form of a thick round disc with flat periphery mounted to rotate easily around the shaft 67 and to idle thereon. As shown in the drawing, the pulley 71 is connected by the V-belt 71e to the pulley 73 secured to and serving to rotate the countershaft 53, and the pulley 72 is connected by the V-belt 72e to the pulley 74 secured to and serving to rotate the countershaft 64. Normally the separable halves of each of the pulleys 71 and 72 are not in sufficient close relation one to the other to make frictional engagement with the V-belt running thereon, but are separated far apart as to form a gap sufficiently wide therebetween as to release the engagement of said V-belt therewith and to cause the same to fall through said gap and to make idling contact with idler racers 71d and 72d respectively. In the case of the V-belt pulley 71, this separation is made possible by securing the hub 71f of the half 71a to the shaft 67 by means of the pin 71g, and by slidably mounting the hub 71h of the companion half 71b upon the said shaft through engagement of its keyway 67a with the key 71j of said half; and in the case of the V-belt pulley 72, separation is likewise made possible by securing the hub 72f of the half 72a to the shaft 67 by means of the pin 72g, and by slidably mounting the hub 72h of the companion half 72b upon said shaft through engagement of its keyway 67b with the key 72j of said half.

In order to slide the keywayed halves 71b and 72b to and from the respective pinned halves 71a and 72a, so as to close and open the gaps therebetween for engagement or disengagement of the V-belts 71e and 72e with the pulleys 71 and 72, we preferably employ the form of conventional clutch mechanism actuated by conventional solenoids as shown in Figs. 3 and 4. For such purpose in the case of the pulley 71, we employ the clevis bracket 75a secured to the side wall 17 of the tank 18, upon which bracket is pivotally mounted the forked lever clutch 75 at the elbow 76 thereof, so that the rollers 76a, 76b rotatably mounted on the ends of the forked arms 76c, 76d of said lever will straddle and make engaging contact with the runway formed by the annular recess 71i in the outer wall of the hub 71h, and so that the lateral movement of the outer end of said lever will cause to be moved longitudinally the keywayed half 71b of pulley 71 and serve to open or close the gap between the halves thereof; such sliding movement being effected by pivotally mounting said outer end of said lever upon and at right angles to the end of the plunger 77 of the conventional solenoid 78 secured by the bracket 79 to the said wall 17 of the tank 18.

Likewise in the case of the pulley 72, we employ the clevis bracket 80 secured to the side wall 17 of the tank 18, upon which bracket is pivotally mounted the forked lever clutch 81 at the elbow 82 thereof, so that the rollers 82a, 82b, rotatably mounted on the ends of the forked arms 82c, 82d of said lever will straddle and make engaging contact with the runway formed by the annular recess 72i in the outer wall of the hub 72h, and so that the lateral movement of the outer end of said lever will cause to be moved longitudinally the keywayed half 72b of pulley 72 and serve to open or close the gap between the halves thereof; such sliding movement being effected by pivotally mounting said outer end of said lever upon and at right angles to the end of the plunger 83 of the conventional solenoid 84 secured by the bracket 85 to the said wall 17 of the tank 18.

In Figs. 8 and 9, we have shown on a greatly enlarged scale our preferred form of fish hook and swivel housing therefor. As shown, the hook 86 is made sharply pointed and without a barb, as is customary in tuna fishing, in order that the fish after being hooked may readily be detached therefrom on the backward throw of the pole; and to facilitate such detachment, we preferably provide the said hook with a housing 44 within which the shank 86a of the hook may be secured and caused to swivel; such housing being in the form of a cylindrical casing with truncated conical top 43, shaped to engage with the socket 88, similarly formed, in the plug 41. Within the body of said casing is the circular chamber 89, to the walls of which are secured the outer races 90, 91 of the preferably stainless steel ball bearings 92, 93, whose inner races 94, 95 are affixed to the reduced end portion 87 of the shank 86a of said hook, said inner races being properly spaced by the collar 99 located on said shank between said bearings and being clamped to the shoulder 86b of said shank by means of the retainer nut 98 in threaded connection with said portion 87; the retainer nut 100 in threaded connection with the inner wall of said casing near the bottom thereof, serves to mount upon said shank the said bearings, keeping in proper spaced relation said bearings by exertion of pressure on outer races 91 and 90 which bear against the inner wall of said casing and, in the case of outer race 90, also against the shoulder 44a provided in said casing.

Closing the bottom of said casing and in threaded connection with the outer wall thereof, is the cap 101, having the central opening 102, through which passes the shank 86a with free play therein. If desired, an annular recess 103, formed in and between the adjacent walls of said cap 101 and the retainer nut 100, and extending around said shank, may serve to receive and hold the packing ring 102a. Also, the locknut 104 in threaded connection with the outer wall of said casing and abutting against the rim 105 of the cap 101, may be used to secure and lock the said cap firmly in place. For securing the end of the fishline 35 to the truncated conical top 43 of said housing 44 we preferably employ the threaded socket 106 engaging with the threaded wall of the cylindrical block 107 having a central opening 107a therethrough, through which the said line passes and whose ends are wedged between the adjacent walls of said block and socket. To hide the hook and provide a lure for the fish, we preferably secure to outer wall of said housing, within a peripheral groove 108 provided therefor, the top ends of short lengths of leather stripping 96 and the feathers 97 extending a substantial distance below.

Preferably the fishline 35 is a flexible stainless steel stranded wire cable of small diameter, capable of carrying loads in excess of 500 pounds, and of sustaining all shocks to which the fishline may be exposed under any fishing conditions.

When our improved fishing apparatus is set up for operation as shown in the drawing, and a school of fish is encountered and fishing is about to begin, conventional fused power switch 113 is closed supplying power to electric circuit from suitable power source 114, motor 79a is started and driving shaft 67 is rotated thereby and continued in rotation until fishing has ceased. Energy is transmitted from said driving shaft to countershafts 64 and 53 by means of V-belts 72e and 71e respectively, in the manner to be described:

When swivel hook 86 is struck by a fish, floating roller 57 is pulled downward so that trunnions 57a and 57b bearing against resilient rods 60 and 61 exert pressure on micro-switches 62 and 62a actuating said switches thereby. Reference to the electrical diagram, Fig. 7, discloses that this procedure will complete the electrical circuit connections of solenoid 84, through micro-switch 62, and will cause said solenoid to operate. Microswitch 62a opens a pair of electrical connections pertaining to the time delay relay 110 and at this time accomplishes nothing more. When plunger 83 of solenoid 84 operates, the rotatably mounted rollers 82a, 82b of the forked arms 82c, 82d, of lever 81, straddling and making engaging contact with the runway formed by the annular recess 72i in the outer wall of the hub 72h, by lateral movement of the outer end of said lever will cause to be moved longitudinally the keywayed half 72b of pulley 72, thus closing the gap between the two halves of pulley 72 and therefore engaging frictionally V-belt 72e. Frictional engagement of said belt turns reel 63 on its countershaft 64, causing loaded swivel hook 86 to proceed upwardly towards socket 88.

Figure 7:
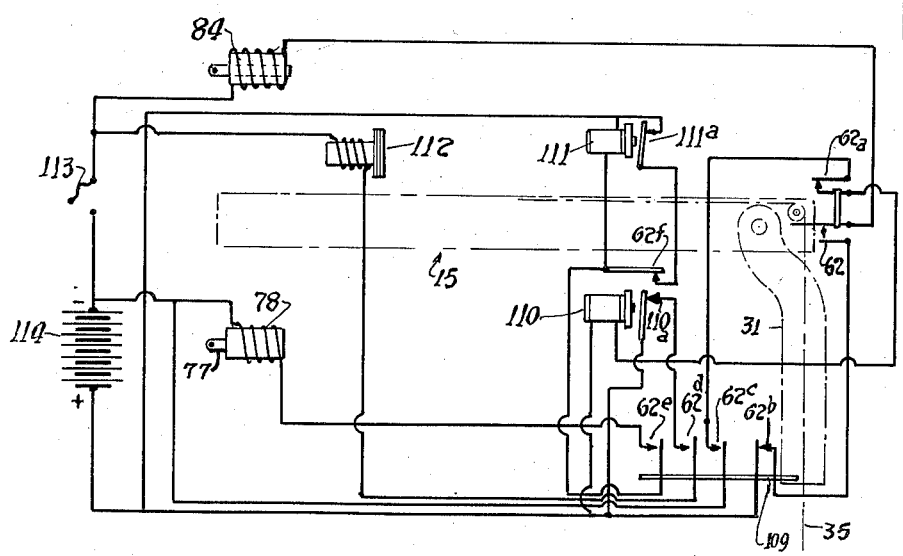
Fig. 7 is a wiring diagram of the electric connections.

When truncated conical top 43 of swivel hook housing 44 enters socket 88, plunger 109 depresses resilient rod 109a affixed thereto, and in turn actuates micro-switches 62b, 62c, 62d, 62e; and as appears from electrical diagram, Fig. 7, micro-switch 62b interrupts the electrical path through solenoid 84 causing plunger 83 to be restored to its normal position, which action in consequence opens the gap between pulley halves 72b and 72a, ending frictional contact with V-belt 72e and causing said belt to fall through the gap and to make idling contact with idler racer 72d. Thus the upward journey of swivel hook 86 is terminated. When the instantaneous action of micro-switch 62b takes place, switch 62c closes a pair of electrical connections pertaining to the time delay relay 110 and for the time being does nothing further; no electrical path being completed through these contacts as contacts of micro-switch 62a up to this time are also open. Switch 62d, also actuated simultaneously with switches 62b, 62c and 62e, by plunger 109, completes the electrical circuit for conventional electric brake 112, applying same to countershaft 64 with which reel 63 turns with said countershaft, thus holding fishline 35, wound around reel 63, and loaded swivel hook 86 in stationary position.

Switch 62e, which was also actuated at the same time as switches 62b, 62c, 62d, by said plunger 109, completes the electrical path for the low resistance-wound solenoid 78, causing plunger 77 to operate so that the rotatably mounted rollers 76a, 76b of the forked arms 76c, 76d, of lever 75, straddling and making engaging contact with the runway formed by the annular recess 71i in the outer wall of the hub 71h, by lateral movement of the outer end of said lever will cause to be moved longitudinally the keywayed half 71b of pulley 71, thus closing the gap between the two halves of said pulley and therefore frictionally engaging V-belt 71e. Such engagement of said belt turns pulley 73 and therefore reel 52, both of which turn together with countershaft 53, drawing inwardly by such action the elongated rectangular tube body 31 of swingle 30 by means of cable 50 winding in on said reel and being connected to welded eye 51 on said tube. Tube 31 of swingle 30 continues to be drawn inwardly toward tank 17 and when the fish clears guardrail 14 the angle of said tube, together with the accelerated motion of the tube, the swiveling action of the unbarbed hook 86, and the squirming of the fish contribute to the discharging of the fish upon the deck 19a of the boat 19.

The released weight of the fish causes the resilient rods 60, 61 to restore towards their normal positions the fractional amount required for the deactivation of micro-switches 62 and 62a respectively. Restoration of said switches to their normal positions causes switch 62 to open its pair of contacts, accomplishing nothing more at this time than to open the electrical path for solenoid 84 at a second point, the first point being at 62b which is still actuated. In the case of switch 62a, reference to the diagram Fig. 7 shows that at this stage the electrical path for time delay relay 110 is completed through said switch contacts and further through the contacts of switch 62c, which have not as yet been released by removal of truncated conical top 43 of swivel hook housing 44 from contact with plunger 109 in socket 88.

Relay 110 is set to operate and open its contacts 110a after current passes through its time delaying components for a predetermined space of time. This time element is based on average length of time starting with the release of the fish from the hook, that it is expected the rectangular tube 31 of swingle 30 will require thereafter for its continued inward and upward movement from its normal vertical position, until said tube contacts micro-switch 62f, to be described presently, until the tube makes its impeded drop, as a result of shock-absorbing action of conventional shock absorber 45, and attains its normal vertical position.

While the time of the delay relay 110 is approaching the predetermined time delay for which it has been adjusted, rectangular tube 31 of swingle 30 continues its inward and upward journey until such time micro-switch 62f is closed by contact with stud 62g, welded or in other manner secured to said tube as shown in Fig. 2. Contact with said switch by said stud will open momentarily the contacts of said switch 62f so that actuating current flows through the very high resistance winding of holding relay 111 energizing said winding and opening the holding relay contacts 111a which, in turn, interrupt the amount of current flow necessary to actuate solenoid 78. Deactivation of said solenoid causes solenoid plunger 77 to restore to its normal at rest position, which action therefore opens gap between pulley halves 71b and 71a ending frictional contact with V-belt 71e and causing said belt to fall through the gap and to make idling contact with idler racer 71d; thus inward and upward movement of tube 31 ends and said tube makes a retarded drop, due to impeding action of shock absorber 45, ultimately reaching in a brief interval its normal vertical position.

By predetermining properly the amount of time to be consumed by tube 31 in its cycle of operation heretofore described, before the automatic fishing apparatus is placed into operation, and by setting the adjustment on time delay relay 110 so that it conforms to this time interval, said relay at the end of this period operates, opening its associated contacts 110a, as tube 31 assumes its normal vertical position, and reference again to electrical diagram, Fig. 7, discloses that at this point the electrical path through electric brake 112 is opened, unbraking countershaft 64 and allowing fishline 35 and unloaded swivel hook 86 to return to its fishing position in the water. When truncated conical top 43 of swivel hook housing 44 leaves socket 88, plunger 109 is restored to normal position by resilient rod 109a and micro-switches 62b, 62c, 62d, 62e return also to normal position and swivel hook 86 and our automatic fishing apparatus is in readiness for the next strike.

Our invention may be embodied in such other specific forms without departing from the spirit or essential characteristics thereof. The present embodiment, as above set forth is therefore to be considered in all respects as illustrative and not restrictive, the scope of our invention being indicated by the appended claims rather than by the foregoing description, and all changes which may come within the meaning and range of equivalency of the claims are therefore intended to be embraced therein.

What we claim and desire to secure by Letters Patent is:

1. In apparatus of the character described, the combination of a fishing pole and swingle depending therefrom, means for securing the same in fishing position over water to part of a fishing boat, a reel and fishing tackle mounted upon said pole and swingle, mechanism connected therewith for operating said reel and swingle to catch and discharge the fish upon the deck of said boat and to restore said parts to normal fishing position, and automatic electro-mechanical means connected therewith for actuating said mechanism upon and after the strike of the fish.

2. In apparatus of the character described, the combination of a rigid fishing pole, a rigid swingle hingedly secured thereto, means for detachably securing said pole in fishing position over water to part of a fishing boat, a reel and fishing tackle mounted upon said pole and swingle, a line connected to run along said pole and swingle, a swivelling hook at the end thereof, mechanism connected with said reel and swingle for operating the same so as to catch the fish upon said hook and to discharge the fish upon the deck of said boat and thereafter to restore said parts to normal fishing position, and automatic electro-mechanical means connected therewith for actuating said mechanism upon and after the strike of the fish.

3. In apparatus of the character described, the combination of a fishing pole, a swingle pivotally secured thereto and downwardly depending therefrom, means for securing the same in extended fishing position with said swingle over the water to part of a fishing boat, a reel, fishing tackle having an unbarbed hook mounted upon said pole and swingle, mechanism connected therewith for reeling in said tackle upon being tripped by the catching of a fish, means cooperating therewith for swinging inwardly said swingle and throwing the caught fish off the hook upon the deck of the boat and to restore said part to normal position, and automatic electro-mechanical means connected therewith for actuating both said reeling mechanism and swingle swinging means upon and after the strike of the fish.

4. In apparatus of the character described, the combination of an elongated rigid fishing pole, a swingle hinged thereto and hanging therefrom, detachable means for securing said pole to part of a fishing boat in braced position with said swingle hanging over the water and said swingle being limited in movement to a path beneath said pole, a reel, fishing tackle with swivelling unbarbed hook mounted upon said pole and swingle, a fish line freely running through passageways therethrough to the lower end of said swingle, mechanism connected with said pole for reeling in said line when tripped by a fish caught by said hook so as to draw said swivelling hook close to said end of said swingle; means cooperating with said mechanism for swinging inwardly said swingle and throwing the caught fish off said hook at the end thereof upon the deck of said boat, and automatic electro-mechanical means for actuating both said reeling mechanism and swinging swingle means upon and after the strike of the fish.

NEILL EVERETT POWELL.
EVERETT McCOWN.

REFERENCES CITED

The following references are of record in the file of this patent:

UNITED STATES PATENTS

| Number | Name | Date |
| --- | --- | --- |
| 202,962 | Robertson et al. | Apr. 30, 1878 |
| 2,303,847 | Lamond | Dec. 1, 1942 |